Dec. 28, 1948.  P. D. DOUGLASS  2,457,537
MOTOR VEHICLE FRONT WHEEL LUBRICATION DEVICE
Filed April 9, 1947

Porter D. Douglass
INVENTOR
BY
ATTORNEYS.

Patented Dec. 28, 1948

2,457,537

UNITED STATES PATENT OFFICE 2,457,537

MOTOR VEHICLE FRONT WHEEL LUBRICATION DEVICE

Porter D. Douglass, Oakland, Calif.

Application April 9, 1947, Serial No. 740,340

4 Claims. (Cl. 308—187)

This invention relates to motor vehicle front wheel lubrication mechanism, the primary object of the invention being to provide a lubricating material in cake or cartridge form, together with means for holding the lubricating material in position adjacent to the bearings of the vehicle wheels, to supply ample lubricant to the bearings at all times.

An important object of the invention is to provide a lubricating apparatus of this character which will insure the lubrication of the bearings for a considerable length of time, eliminating the necessity of frequently lubricating the bearings of the wheels as is necessary with the present front wheel structure.

An important object of the invention is to provide a lubricating mechanism of this character which may be readily and easily applied to front wheel motor vehicle construction now in common use, eliminating the necessity of making extensive alterations in the front wheel spindle or bearing structure, in order to mount the device.

Still another object of the invention is to provide grease cartridges, together with yieldable means for urging the grease cartridges towards the bearings lubricated or supplied with grease therefrom, to insure the lubrication of the bearings at all times.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawing.

Figure 1:
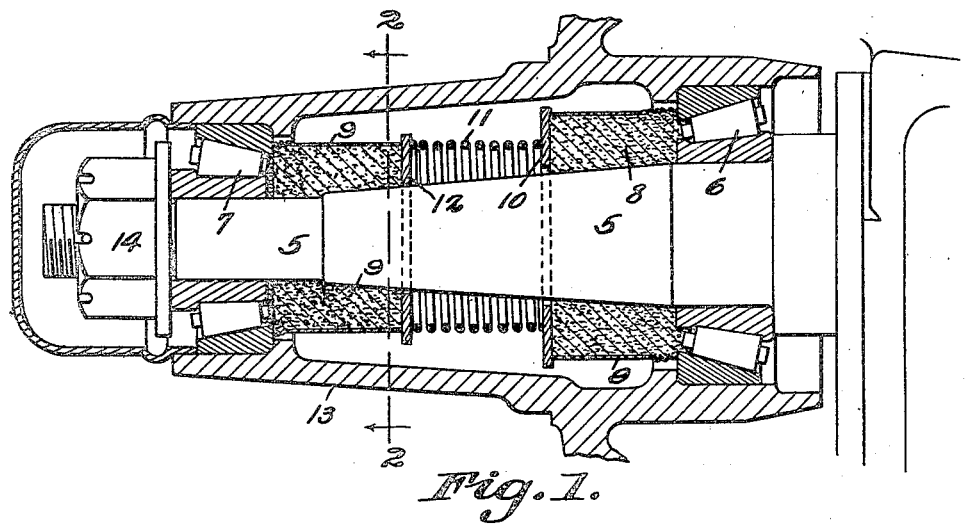
Figure 1 is a longitudinal sectional view through the hub of a wheel, illustrating a motor vehicle front spindle in elevation, with the lubricating means forming the subject matter of the present invention, as positioned on the spindle, adjacent to the bearings of the wheel hub.
Figure 2:
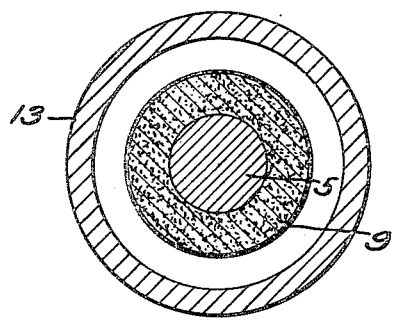
Figure 2 is a sectional view taken on line 2—2 of Figure 1.

Referring to the drawing in detail, the reference character 5 indicates the front axle or spindle of a motor vehicle, the reference character 6 indicating the bearings adjacent to the inner end of the spindle, while the reference character 7, indicates bearings disposed at the outer end of the spindle.

The device forming the subject matter of the present invention, embodies an inner grease cartridge 8 and an outer grease cartridge 9, the grease cartridges embodying paper containers which are filled with bearing grease compressed with a quantity of graphite which renders the grease hard to prevent running of the grease.

These cartridges are formed with central openings to permit them to be fitted over the spindle 5, in a manner as shown by Figure 1 of the drawing. As shown, it will be seen that the cartridges are positioned with their outer ends contacting the inner edges of the bearing races, so that movement of the bearings within the races will tend to soften the lubricant to cause it to pass to the surfaces of the bearings.

Positioned over one end of the inner grease cartridge 8, is a disc 10 against which the one end of the coiled spring 11 engages, the opposite end of the coiled spring 11, engaging the disc 12 which bears against the inner end of the outer grease cartridge 9, the action of the spring against the discs 10 and 12 being such as to cause the cartridges to be held into close engagement with the inner surfaces of the bearing races at all times, to supply lubricant thereto.

The reference character 13 indicates the hub of a wheel which operates over the bearings, and the reference character 14 indicates the usual nut employed in securing the wheel to its axle or spindle.

From the foregoing, it will be seen that due to the construction shown and described, I have provided a lubricating mechanism for front bearings or spindles of motor vehicles, which will supply lubricating material to the bearings of the axles or spindles, for a long period of time, eliminating the necessity of frequently packing the bearings in servicing the motor vehicle.

What is claimed is:

1. The combination with the bearing races of a spindle and wheel operating on the spindle, of a lubricating mechanism comprising cartridges containing lubricating material, said cartridges having central openings for positioning over the spindle in contact with the bearing races, and a yieldable member disposed between the cartridges adapted to urge the cartridges into engagement with the bearings, lubricating the bearings.

2. The combination with the bearing races of a spindle and wheel operating on the spindle, of a lubricating mechanism comprising cartridges containing lubricating material in cake form, said cartridges having openings for positioning over the spindle, in contact with the bearing races, discs mounted on the spindle and engaging the inner ends of the cartridges, a coiled spring positioned over the spindle, the ends of the coiled spring resting against the discs, urging the discs laterally into contact with the bearing races, lubricating the bearings.

3. The combination with the bearing races of a spindle and wheel mounted thereon, of a lubricating mechanism comprising cartridges constructed of perishable material, in which lubricating material in cake form is held, said cartridges having openings for positioning over the spindle in contact with the bearing races, and yieldable means disposed between adjacent cartridges adapted to spread the cartridges and feed the lubricating material to the bearing races lubricating the bearings thereof.

4. The combination with the bearing races of a spindle and wheel mounted thereon, of a lubricating mechanism comprising cartridges constructed of perishable material, said cartridges having open ends, said cartridges having openings for positioning over a spindle, the outer ends of the cartrdges adapted to rest against the bearing races lubricated thereby, discs closing the adjacent inner ends of the cartridges, a coiled spring mounted on the axle and engaging the discs, normally urging the discs and cartridges laterally feeding the cartridges towards the bearings lubricated.

PORTER D. DOUGLASS.

REFERENCES CITED

The following references are of record in the file of this patent:

FOREIGN PATENTS

| Number | Country | Date |
|---|---|---|
| 96,910 | Switzerland | Nov. 16, 1922 |